United States Patent [19]
Fontanes

[11] 3,969,617
[45] July 13, 1976

[54] MULTICHANNEL DIGITAL MODULATOR

[75] Inventor: Sylvain Fontanes, Chatou, France

[73] Assignee: Compagnie Europeenne de Teletransmission (C.E.T.T.), Chaton, France

[22] Filed: Apr. 8, 1975

[21] Appl. No.: 566,512

[30] Foreign Application Priority Data
Apr. 12, 1974 France .............................. 74.13068

[52] U.S. Cl. ................................. 235/152; 332/21; 332/40
[51] Int. Cl.² ......................................... H03C 5/00
[58] Field of Search ................ 235/152; 332/17, 21, 332/40; 178/DIG. 7; 179/15 BM; 325/47, 145

[56] References Cited
UNITED STATES PATENTS

| | | | |
|---|---|---|---|
| 3,378,773 | 4/1968 | Jeffers.............................. | 332/21 X |
| 3,654,450 | 4/1972 | Webb................................ | 235/152 X |
| 3,706,945 | 12/1972 | Yanagidaira et al................. | 332/17 |
| 3,763,364 | 10/1973 | Deutsch et al...................... | 235/152 |
| 3,805,191 | 4/1974 | Kawai et al........................ | 332/21 X |
| 3,813,528 | 5/1974 | Blanding............................ | 235/152 |

OTHER PUBLICATIONS
J. Tierney et al. "A Digital Frequency Synthesizer" *IEEE Trans. on Audio & Electroacoustics,* Mar. 1971 pp. 48–57.

*Primary Examiner*—David H. Malzahn
*Attorney, Agent, or Firm*—Cushman, Darby and Cushman

[57] ABSTRACT

In a modulator of the type including a memory in which coded binary words representative of samples of a cycle of a sinusoidal signal are stored, which coded words are used to synthesize the modulated signal, the bits of each input digital signal $S_i$ are grouped in groups of $P_i$ bits ($P_i \geq 1$) and the sampling of the groups is so performed that several samples of each group appear in the multiplexed signal resulting from the sampling. Each sample of each group causes the reading of a coded word. This process gives a wide range of possibilities as concerns the transmission speeds of the input channels and the choice of the carrier frequency and of the number of modulation levels for each modulated signal.

7 Claims, 4 Drawing Figures

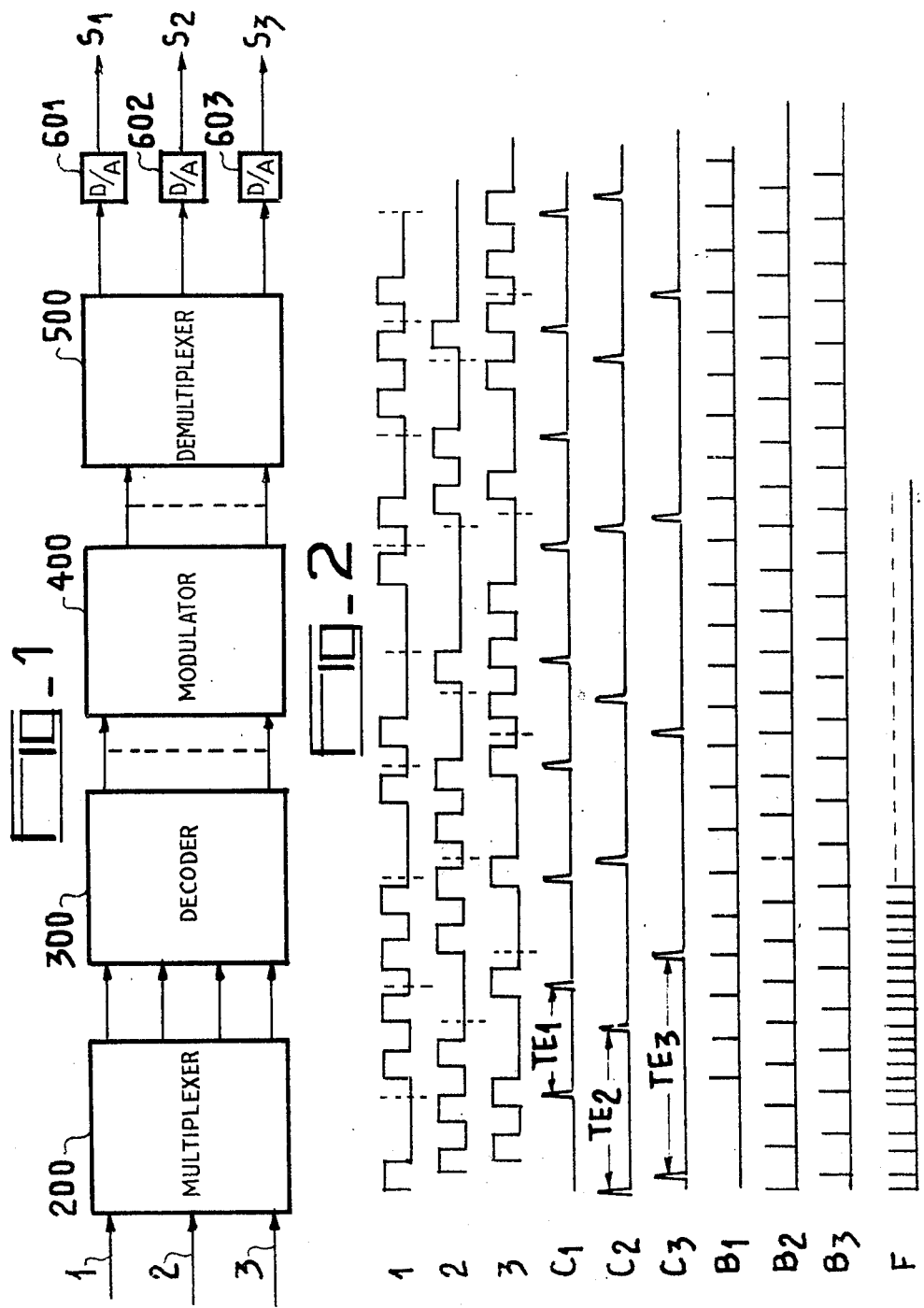

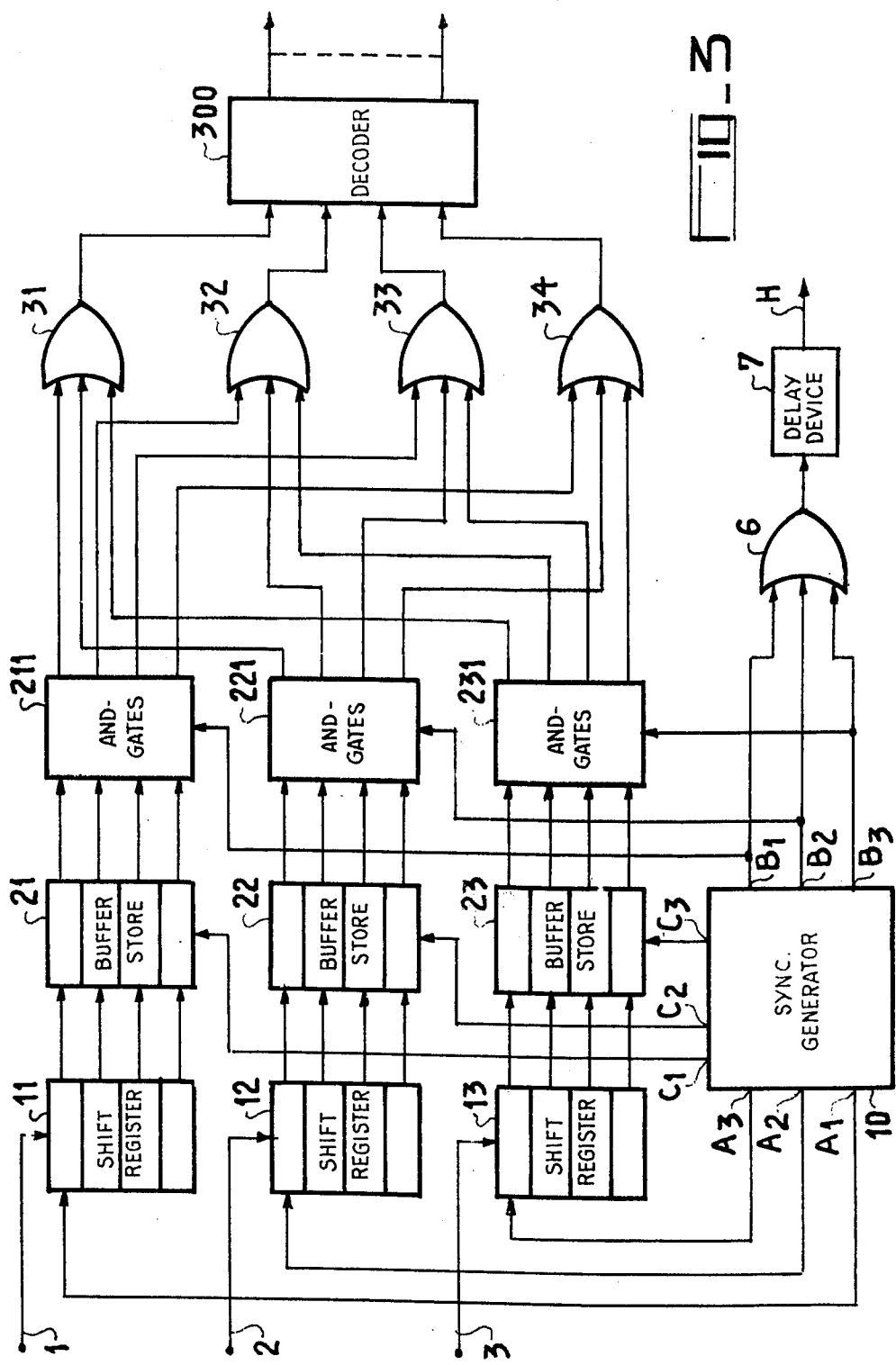

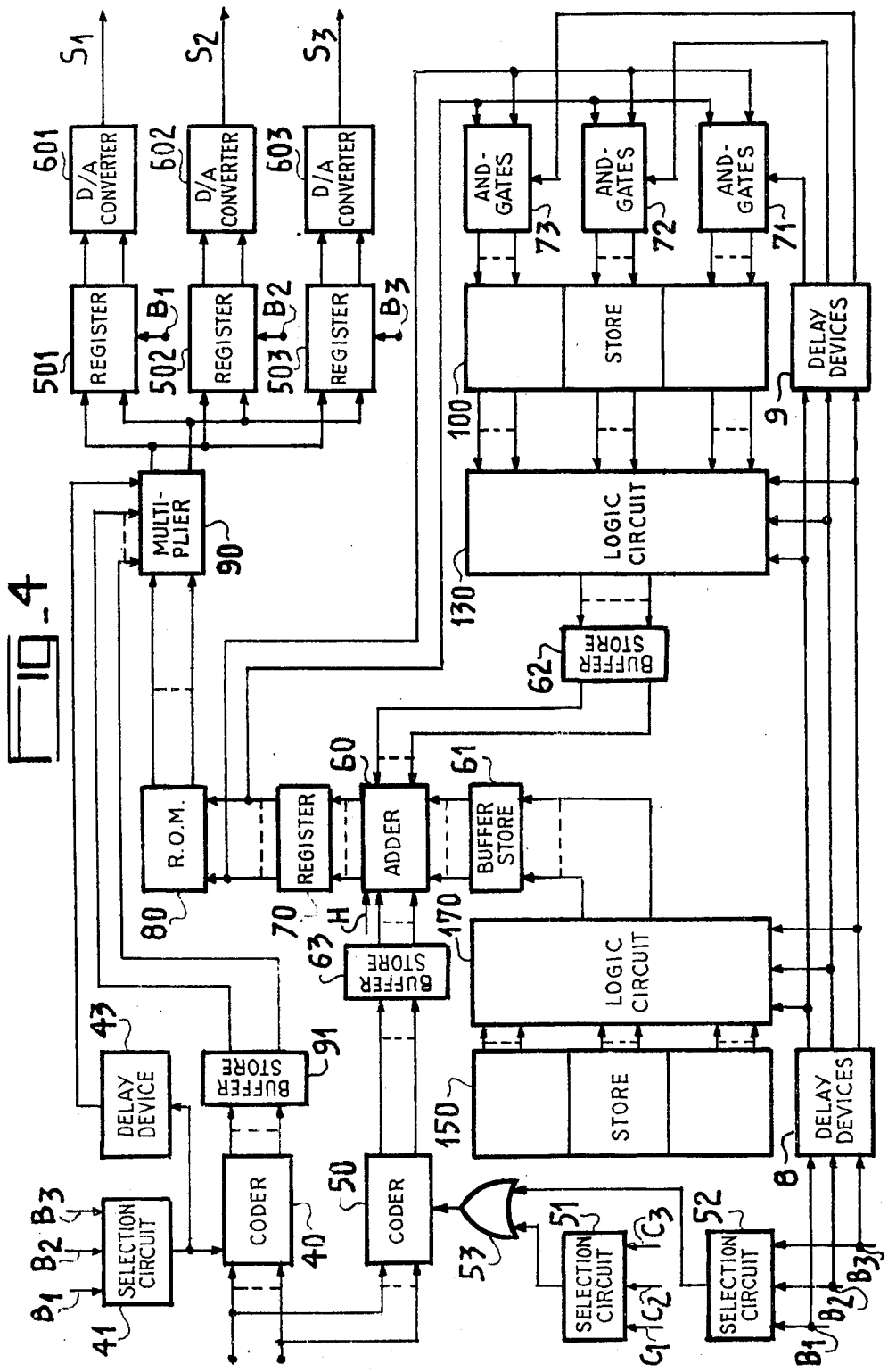

MULTICHANNEL DIGITAL MODULATOR

The present invention relates to a multi-channel modulator, the modulation proper being effected digitally using binary signals.

The utilisation of a digital system in order to generate an amplitude-modulated carrier, phase-modulated carrier or a frequency-modulated signal, makes it possible, by contrast with a modulation system using analogue techniques, to effect through a single modulator the modulation of several binary signals coming from different sources. Those skilled in the art will be aware of the existence of digital modulators which modulate several information signals either in phase, in amplitude or in frequency, or again in amplitude and phase simultaneously. However, these multiple modulators require that their input channels should have the same transmission speed.

The object of the present invention is a multi-channel digital modulator allowing a wide range of possibilities as concerns the transmission speeds of its input channels, and the choice of the number of modulation levels for each channel.

The output channels have different carrier frequencies if required.

In accordance with the invention, a digital modulator is adapted for receiving $n$ input binary digital signals $S_i$, $i = 1, 2 \ldots n$, $n$ being an integer greater than one, said modulator comprising a memory in which coded binary words representative of samples of a sinusoidal signal are stored, said memory having an address input and an output;

$n$ channel circuits for respectively grouping the successive bits of each input signal $S_i$ in groups of $P_i$ bits, each $P_i$ being a positive integer, said $n$ channel circuits having respective outputs;

a multiplexing circuit, having an output, and comprising means for sampling the output groups of said $n$ channel circuits, a sample of a group bein formed by sampling each bit of this group, and the sampling of the $n$ channel output groups being performed cyclically, said multiplexing circuit thus delivering at its output a multiplexed signal comprising a plurality of samples of each of said groups, a group having given rise to a sample being termed the parent group of this sample;

a coding arrangement having an input coupled to the output of said multiplexing circuit and an output coupled to said address input for delivering to said address input, for each sample included in said multiplexed signal, an address signal and means for successively reading the coded words respectively corresponding to the successive address signals.

The invention will be better understood and other of its features rendered apparent, from a consideration of the ensuing description and with reference to the attached drawings where:

FIG. 1 illustrates a block diagram of an embodiment of the modulator in accordance with the invention;

FIG. 2 illustrates a diagram of the time-base signals used in the modulator of FIG. 1;

FIG. 3 illustrates the arrangement for multiplexing and sampling the binary data signals;

FIG. 4 illustrates the arrangement for modulating and demultiplexing the sampled signals.

To simplify the drawings and description, the invention will be described in relation to the case of a modulator having only three input channels. On the other hand, since the multiplexing function is performed by the grouping of $p_i$ bits ($p_i$ is a positive whole number) of the input signal to each channel, where $p_i$ may differ from one channel to the next, the maximum value of $p_i$ for the three channels has been assumed to be 4; the modifications to be made to the circuits for a channel number in excess of 3 and a maximum value of $p_i$ in excess of 4, are entirely within the scope of the person skilled in the art.

FIG. 1 illustrates the elements of the modulator in accordance with the invention. In this diagram, the synchronising signal generator and the control signals for each element have not been shown. They have been shown in FIGS. 3 and 4, FIG. 2 illustrating an example of possible signals. The three input channels 1, 2 and 3 supply, in parallel, a multiplexer 200 which groups the series bits of each input channel into groups of $p_i$ bits as indicated earlier. The bits in each group are sampled several times, the sampling taking place simultaneously, for the bits of any group and cyclically in respect of each of the three channels and the sampling frequencies being chosen in order to obtain correct interlacing of the samples corresponding to the different channels. The four outputs of the multiplexer produce the $p_i$ parallel bits of each group (those outputs to which no signal is applied produce a 0 bit). A decoder 300 whose four inputs are connected to the four outputs of the multiplexer 200, decodes the binary number displayed by its four inputs and produces a corresponding signal at one of its sixteen outputs. The sixteen outputs of the decoder 300 are connected to the sixteen inputs of a modulator 400 responsible for the coding of the samples presented to one or the other of its inputs, into amplitude samples in the form of amplitude words made up of 12 parallel bits, each word representing an amplitude sample of a sinusoidal function, taken from a number of stored amplitude words as will be explained later on; the choice of the stored words is determined by the type of modulation the carrier frequency of the transmission channel and the amplitude word previously taken from the store for the same channel. Demultiplexing is carried out in the demultiplexer 500 which is supplied with the coded words appearing at the outputs of the modulator, the words corresponding to a given input channel being directed to the corresponding output channel. Each of the three output channels $S_1$, $S_2$, $S_3$ comprises a digital-to-analog decoder, respectively 601, 602, 603, producing an amplitude-modulated, phase-modulated, frequency-modulated or phase and amplitude-modulated analogue signal.

FIG. 3 illustrates the multiplexer and decoder for the binary data signals. It comprises a synchronisation signal generator 10 supplying the whole of the synchronising signals. These signals are shown in FIG. 2 and will be introduced at the time at which they come into play. In order to simplify notation, the outputs of the synchronising signal generator 10 have been designated in the same fashion as the corresponding signals in the diagram of FIG. 2.

This device also has the inputs 1, 2, 3 designed to receive the binary data signals appearing in the rhythm of the synchronising signals respectively $A_1$, $A_2$ and $A_3$ which have frequencies ranging between 200 and 19,200 Hz. In this example, these three frequencies are assumed to be equal to $F_A$, with a corresponding period of $T_A$.

The multiplexer 200 shown in FIG. 1 has three shift-registers, three buffer stores and a logic circuit, connected in the manner described later on.

The three inputs 1, 2, 3, are respectively connected to the inputs of three four-stage shift registers 11, 12, 13. The shift rates of these three registers are respectively controlled by the synchronising signals $A_1$, $A_2$, $A_3$ applied to the clock input of each of the registers. The outputs of the four stages of each of the registers 11, 12, 13 are respectively connected to the inputs of the four stages of three buffer stores 21, 22, and 23. These buffer stores store the contents of the shift registers at instants determined by pulse-type synchronising signals $C_1$, $C_2$ and $C_3$ applied to writing control inputs of the three buffer stores and having respective frequencies $F_{C1}$, $F_{C2}$, $F_{C3}$. These signals are directly associated in phase and frequency, with the synchronising signals $A_1$, $A_2$ and $A_3$ and control the transfer of the content of the shift registers to the buffer stores when the shift registers have received $p_i$ bits ($i = 1$ to 3), $p_i$ being a number which is less than or equal to 4 in the chosen example. The numbers $p_i$ may differ in accordance with the channel involved, as a function of the number of modulation levels used. Thus, for frequency modulation using frequency shift (FSK) with four frequencies, in channel 1, the groups will be groups of 2 bits and the frequency relationship $F_{C1} = F_{A/2}$ will obtain. Similarly, for amplitude modulation (PAM) with 8 levels, in channel 2, the groups will be groups of 3 bits and the frequency relationship will be $F_{C2} = F_{A/3}$, whilst for phase modulation PSK, using 16 phases, in channel 3, the groups will be groups of 4 bits and the frequency relationship will be $f_{C3} = F_{A/4}$. This is the example which has been chosen in order to draw up the synchronising signal diagram of FIG. 2. The periods of the signals $C_i$ will be referred to as the elementary modulation time: let $T_{E1}$, $T_{E2}$, and $T_{E3}$ be the respective periods of the signals $C_1$, $C_2$, and $C_3$.

The four outputs of each of the three buffer stores are respectively connected to the four inputs of the decoder 300 through a logic circuit which makes it possible to supply the inputs of the decoder from one or the other of the buffer stores 21, 22 and 23.

This logic circuit is formed on the one hand by three groups of 4 AND-gates with 2 inputs, 211, 221 and 231, supplied at their first inputs with the output signals from the stages 1 to 4 of the buffer stores, respectively 21, 22 and 23, and at their second inputs with a sampling signal, $B_1$ in the case of the group of gates 211, $B_2$ in the case of the group of gates 221 and $B_3$ in the case of the group of gates 231. These signals $B_1$, $B_2$, $B_3$ are programmed by the generator 10 as a function of the number of input channels, so that the interlacing of the samples is correct, that is to say that the decoder is supplied at a fixed frequency. To simplify the modulator, and in order to make it simple to multiplexer the channels at the modulating arrangement, the signals $B_1$, $B_2$ and $B_3$ are chosen to have the same frequency, for example a frequency which is a multiple of a frequency $F_{Ci}$. In the chosen example $F_{B1} = F_{B2} = F_{B3} = F_B = 4 F_{C2}$ and these three signals are time-shifted by $T_{B/3} = \frac{1}{3} F_B$ so that the samples appear at the decoder at a fixed rate F. These signals take the form of narrow pulses (of the order of 1 microsecond in width) at a rate at least equal to 8 KHz for each of the channels, if it is telephony channels which are involved (the only restriction here being that imposed by the requirements of sampling theory).

The number of samples representing a group of bits in an input channel is a function of the elementary modulation time of the corresponding channel (time interval separating two pulses in the corresponding signal $C_i$), and of the sampling frequency, signal $B_i$, associated with said same channel. This number may vary by one unit, since the signals $B_i$ are not necessarily synchronous with the signal $A_i$ and $C_i$. This does not constitute any drawback as far as the operation of the arrangement is concerned.

The outputs of the first gates of each group 211, 221 and 231 are connected to the three inputs of an OR-gate 31; similarly, the outputs of the second gates of each group are connected to an OR-gate 32, the outputs of the third gates of each group to an OR-gate 33 and the outputs of the fourth gates to an OR-gate 34. The outputs of the four OR-gates, respectively 31, 32, 33, 34, are connected to the inputs 1 to 4 of the decoder 300.

A transfer of the information contained in the buffer stores 21, 22, 23 to the decoder 300, is therefore performed at the rate F created by the composition of the sampling signals $B_1$, $B_2$, $B_3$, namely $F = 3 F_B$, in the chosen example. A signal H of frequency F, which is used subsequently, is produced from the signals $B_1$, $B_2$ and $B_3$ applied to the inputs of an OR-gate 6, the output of the latter being connected to the input of a delay device 7.

Each of the 16 outputs of the decoder 300 is characteristic of a combination of the binary signals applied to its inputs.

FIG. 4 illustrates the modulator, 400, and the demultiplexer 500. The 16 inputs of this arrangement are connected to the outputs of the decoder 300. This arrangement comprises two coders supplied by the 16 inputs of the device, one of said coders, 40, corresponding to the coding of the 16 outputs of the decoder in the form of multiplication coefficients corresponding to the amplitude modulation levels, and the other of said coders, 50, corresponding to the coding of the 16 outputs of the decoder in the form of phase-shifts for differential phase and frequency modulation. Some of the outputs of the decoder 300 may never be utilised at all, the number of outputs used being a function of the number of modulation levels for the type of modulation involved.

The multiplication coefficient is 1 for all the samples from channels which are phase modulated or frequency modulated, and the phase-shift word is zero for the samples corresponding to channels which are simply amplitude modulated.

The coder 40 is controlled by the signals B belonging to the amplitude modulating channels, channel $B_3$ in this instance, through a selection circuit 41 whose output is connected to a clock input of the circuit 40. Amplitude modulation is performed on all the samples occuring in the elementary time. This selection circuit 41 receives the signals $B_i$ corresponding to all the channels, and only transmits to the coder 40 those corresponding to the channels which are to be amplitude modulated or simultaneously amplitude and phase modulated. This selection can be performed manually by the use of switches or may be programmed. When a pulse corresponding to one or the other of the channels which are to be amplitude modulated, appears at the clock input, the signal appearing simultaneously at one of the inputs of the coder 40 is coded to form a multiplication coefficient in the form of a coded word made up of four parallel bits. This coded word is recorded in a buffer store 91, with four inputs and four outputs.

The buffer store outputs 91 are connected to four inputs of a multiplier 90.

This multiplier is supplied at a control input with the output signal coming from the selection circuit 41, said signal having been suitably delayed by a delay device 43, and is supplied at 12 other inputs with a coded 12-bit word coming from a ROM (read only memory) 80 and representing a sample $y = k \sin X$ of a sinusoidal cycle of amplitude $k$, the phase being $X = x/d\ 360°$ where $d$ is the number of stored words equal to 256, and $x$ constitutes the address of a word in the ROM expressed in the form of an 8-bit word.

The addresses to be used are computed, modulo 256, in the form of coded 8-bit words, in an adder 60 with three multiple inputs. This address is transmitted to the ROM through a register 70 whose outputs are connected to the address inputs of the ROM 80. The three multiple inputs of the adder are connected to the multiple outputs of three buffer stores 61, 62 and 63 designed to respectively receive a coded word coming from the coder 50, a coded word corresponding to an "initial phase" and a coded word corresponding to an "operating phase".

A store 150, which we will call the "operating store", having three stages, is programmed for each of the channels. Each stage contains the shift which the address $x_1$ of an amplitude word must undergo, in order to obtain, at the output of the store 80, the address $x_2$ of the next amplitude word for the same channel, the difference between the addresses $x_1$ and $x_2$ of these two successive amplitude words being characteristic of the basic frequency (transmitted through the line when there is no modulation) of the considered channel. The address shifts are determined by binary numbers in the form of 4 parallel bits. The 4 outputs of each of these three stages are respectively connected to the four inputs of the buffer store 61 through a logic circuit 170 constituted in the same manner as that which links the outputs of the four buffer stores 21, 22 and 23 to the inputs of the decoder in FIG. 3, that is to say by 3 groups of 4 AND-gates whose first inputs are connected to the outputs of the stages of the store 150 and whose second inputs are connected to the outputs of a delay arrangement 8 formed by 3 delay devices and delaying the sampling signals $B_1$, $B_2$ and $B_3$ by a delay $R_1$. The outputs of the AND-gates are connected to the inputs of 4 OR-gates with 3 inputs each, the outputs of these OR-gates being connected to the signal inputs of the four stages of the buffer store 61.

The delay $R_1$ corresponds to the time required by the circuit 50 in order to give a coded word representing a phase-shift. This delay corresponds to the time required for 3 or 4 logic operations and should not exceed 1 microsecond.

A store which we will call the "initial phase" store is constituted as follows: The 8 outputs of the register 70 are connected to 8 inputs of one of the three stages of a store 100 by means of a logic circuit consisting of three groups 71, 72 and 73 of 8 two-input AND-gates, the 8 gates of each group being connected by their first inputs to the 8 outputs of the register 70 and by their second inputs respectively to the first, second or third output of a delay arrangement 9 with three delay devices, respectively delaying the signals $B_1$, $B_2$ and $B_3$ already delayed by $R_1$, by an additional delay $R_2$. The delay $R_2$ corresponds to the time required by the adder 60 in order to carry out the addition operation and feed the result into the register 70. This delay will not be more than a few microseconds in the case where an adding register is used, and one microsecond in the case where a TTL technology is employed and the adders are designed in the form of EXCLUSIVE-OR-gates and carry over circuits. The 8 outputs of each of the three groups 71, 72, and 73 of AND-gates are connected to 8 inputs of a stage of a three-stage store 100. The contents of each of the three stages of the store 100 is transferred to the 8-input buffer store 62 at the rate of the signal $B_1$ in the case of the first stage, at the rate of the signal $B_2$ in the case of the second and at the rate of the signal $B_3$ in the case of the third, by a logic circuit 130 formed by three groups of 8 AND-gates with two inputs each and 8 OR-gates connected in the same fashion as the gates of the logic circuit 170.

The coder 50 supplies the third information to the adder. It is controlled, by the signals $B_i$ from the channels which are to be frequency-modulated and by the signals $C_i$ from the channels which are to be phase-modulated, through two selection circuits 51 and 52 which respectively receive the signals $C_i$ and the signal $B_i$ from all the channels. In other words, frequency modulation in a channel is carried out by phase shifts in all the amplitude words of each elementary time, whilst phase modulation is carried out by a phase-shift affecting only the first amplitude word of each elementary time. The output of the selection circuit 51 is connected to an input of an OR-gate 53 whose other input is connected to the output of the selection circuit 52. The selection of the phase-modulated channels by the circuit 51 and of the frequency-modulated channels by the circuit 52, can be performed manually by means of switches, or can be a programmed function. The output of the OR-gate 53 is connected to a clock input of the coder 50. When a pulse B (or C) corresponding to one or the other of the frequency-modulated channels (or phase-modulated channels) appears at the clock input of the coder 50, the pulse appearing simultaneously at one of the 16 inputs of the circuit is coded to form a word representing a phase-shift to be given to the output signal, this being translated into terms of an additional address shift.

Thus the transmission of a pulse B to the coder 50 by the selection circuit 52, results in the application to the adder 60, via the buffer store 63, of a coded word corresponding to additional address shift. The buffer stores 61, 62 and 63 are formed by D type trigger circuits and change state in accordance with the state of the outputs of the logic circuit 170, the logic circuit 130 and the coder 50, at instants determined by the trailing edges of the signals $B_1$, $B_2$ and $B_3$ or by their suitably delayed leading edges, these signals being applied to their clock inputs (in order to simplify the diagram, the clock inputs have not been illustrated). The adder 60, besides its three multiple inputs, has an add control input supplied with the signal H of frequency F, defined earlier on (FIG. 3).

Computation in the adder, of the address of an amplitude word for an amplitude-modulated channel, is carried out in the following way:

The initial phase store contains the address, in the dead store, of the preceding amplitude word, belonging to the same channel, which has been transmitted down the line, and the operation store contains the address shift to be assigned to an amplitude word in order that the basic frequency of the corresponding channel shall be transmitted through the line when the coder 50 supplies a zero address shift. If $f$ is the basic frequency of the channel in question and K the number of amplitude words for a basic signal period, the operating store makes it possible to increase the address of the preceding sample by $1/Kf$. Thus, it is samples characteristic of the basic frequency which are transmitted through the line, the amplitude modulation being carried out, as indicated earlier, in the multiplier 90.

Considering a phase-modulated channel, the initial phase store and the operation store contain the same data as for an amplitude modulation channel, but the coding circuit 50 produces an additional address shift in respect of the first sample following a change in state in the buffer store 23 supplying the decoder 300.

Considering a frequency-modulated channel, the initial phase store and the operation store still contain the same data and the coder 50 produces an additional address shift which is applied to all the samples of the corresponding elementary time.

The number $j$ of binary outputs possessed by the multiplier 90 is a function of the maximum number of amplitude modulation levels. The demultiplexing of the samples corresponding to each of these channels is carried out by means of three registers 501, 502 and 503 corresponding to the three input channels. Each register has $j$ inputs connected to the $j$ outputs of the multiplier 90, and a clock input supplied with the respective sampling signals $B_1$, $B_2$ and $B_3$, suitably delayed for the registers 501, 502 and 503.

Each register 501, 502 and 503 has $j$ outputs connected to the $j$ inputs of an associated digital-to-analog converter 601, 602, 603 equipped with a low-pass output filter corresponding respectively with the output channels $S_1$, $S_2$ and $S_3$. At the output of each digital-analog coverter, an analog signal signal is generated which is a function of the amplitude samples appearing at its inputs at the rate of the corresponding signal $B_i$.

The invention is not limited to the emobidment described. In particular, the method of modulation and multiplexing which is used makes it possible to simultaneously modulate a large number of input digital signals and supply the modulated signals to associated outputs channels by means of a single central processor. The arrangement makes it possible to switch rapidly from one type of modulation to another, enabling either the transfer of the signal $B_i$ by the circuit 41, or the transfer of the signal $B_i$ by the circuit 52, or the transfer of the signal $C_i$ by the circuit 51 or, simultaneously, the transfer of the signal $B_i$ by the circuit 41 and the transfer of the signal $C_i$ by the circuit 51. A four-position switch for each channel is sufficient to make it possible to change from amplitude modulation to frequency modulation, phase modulation or amplitude and phase modulation together.

The modification in the number of modulation levels is achieved by varying the frequency-division coefficient, in the synchronisation signal generator, which coefficient links the frequency $F_{Ci}$ with that $F_{Ai}$, and this has the effect of varying the number $p_i$ of grouped bits in the corresponding channel $i$ and therefore the line modulation rate.

If the frequencies of the binary input signals are different, the two channels may have the same elementary modulation time but with a different number of modulation levels.

If a modulator of the kind described is used to modulate a set of telephone lines transmitting binary information signals, the line modulation rate is always less than or equal to 1600 Bauds. The rate of corresponding clock pulses $C_i$ is then less than or equal to 1600 Hz.

To give the synchronisation signal generator a modular design, it is conceivable that the possible groupings of bits in the input channels could be limited to 1, 2, 4, 8 and 12 bits, thus limiting the possible number of modulation levels. The maximum frequency of the binary input signals for a modulation rate of 1600 Bauds, would then be $F_A = 19200$ Hz for a grouping of 12 bits.

The corresponding frequency $F_C$, namely $F_A/12$, is achieved by the division of $F_A$.

It is conceivable that there could be four different modulation rates, for example 1600, 1200, 600 and 200 Bauds, corresponding to respective maximum frequencies $F_A$, of: 19,200, 14,400, 7,200 and 2,400 Hz (for groupings of 12 bits).

The intermediate frequencies $F_A$ for groupings of 8, 4 and 2 bits) and the corresponding frequencies $F_C$, are obtained by a division of the maximum frequencies $F_A$ corresponding to the same modulation rate, in the respective ratios 12/8, 12/4, 12/2, and 12.

All the synchronising signals $F_A$ and $F_C$ can thus be obtained from one and the same oscillator.

Of course the modulator according to the invention may also may be designed for a single type of modulation.

I claim:

1. A digital modulator adapted for receiving $n$ input binary digital signals $S_i$, $i = 1, 2 \ldots n$, $n$ being an integer greater than one, said modulator comprising
    a memory in which coded binary words representative of samples of a sinusoidal signal are stored, said memory having an address input and an output;
    $n$ channel circuits for respectively grouping the successive bits of each input signal $S_i$ in groups of $P_i$ bits, each $P_i$ being a positive integer, said $n$ channel circuits having respective outputs;
    a multiplexing circuit, having an output, and comprising means for sampling the output groups of said $n$ channel circuits, a sample of a group being formed by sampling each bit of this group, and the sampling of the $n$ channel output groups being performed cyclically, said multiplexing circuit thus delivering at its output a multiplexed signal comprising a plurality of samples of each of said groups, a group having given rise to a sample being termed the parent group of this sample;
    a coding arrangement having an input coupled to the output of said multiplexing circuit and an output coupled to said address input for delivering to said address input, for each sample included in said multiplexed signal, an address signal and means for successively reading the coded words respectively corresponding to the successive address signals.

2. A digital modulator as claimed in claim 1, allowing phase modulation, wherein said coding arrangement comprises means for supplying, for the first sample of a parent group originating from an input signal $S_i$ giving rise to a phase modulated output signal from the modulator, an address signal which is a function of the bits forming the parent group, and, for the other samples of this parent group, an address signal which is independent from the bits forming th parent group.

3. A digital modulator as claimed in claim 1, allowing frequency modulation, wherein said coding arrangement comprises means for supplying for each sample of a parent group originating from an input signal $S_i$ giving rise to a frequency modulated output signal from the modulator, an address signal which is a function of the bits forming the parent group.

4. A digital modulator as claimed in claim 1, allowing amplitude modulation, wherein said output of said memory is coupled to a multiplier, and wherein said coding arrangement comprises means for each sample of a parent group originating from an input signal $S_i$ giving rise to an amplitude modulated output signal from the modulator:
  i. supplying, to said address input, an address signal which is independent from the bits forming the parent group,
  ii. supplying, to said multiplier, a multiplying signal which is a function of the bits forming the parent group.

5. A digital modulator as claimed in claim 4, allowing phase modulation, frequency modulation and amplitude modulation, wherein said coding arrangement includes a first coder for supplying to said address input, for each sample included in said multiplexed signal, an address signal which is a function of the bits forming the parent group if this sample is the first one of a group originating from an input signal $S_i$ giving rise to a phase modulated output signal from the modulator, or if this sample is any one of the samples of a group originating from an input signal $S_i$ giving rise to a frequency modulated output signal from the modulator, and an address signal independent of the bits forming the parent group in all the other cases, and a second coder for supplying to said multiplier said multiplying signal for each sample of a group originating from an input signal giving rise to an amplitude modulated output signal from the modulator, and a signal which is independent from the bits forming the parent group in the other cases.

6. A digital modulator as claimed in claim 1 comprising an output circuit coupled to the output of said memory, said output circuit comprising a digital demultiplexer and $n$ digital-to-analog converters fed by said demultiplexer, means for applying to said multiplexing circuit sampling pulses, means for delaying said sampling pulses and for applying the delayed sampling pulses to said demultiplexer.

7. A digital modulator as claimed in claim 6 including a multiplier through which said output circuit is coupled to said output of said memory.

* * * * *